United States Patent
Mendelsohn et al.

(10) Patent No.: US 7,396,281 B2
(45) Date of Patent: Jul. 8, 2008

(54) PARTICIPANT INTERACTION WITH ENTERTAINMENT IN REAL AND VIRTUAL ENVIRONMENTS

(75) Inventors: Seth Mendelsohn, Tustin, CA (US); Terry M. Dobson, Burbank, CA (US); Roger S. Holzberg, Burbank, CA (US); Jeff Voris, Los Angeles, CA (US); Edmond J. Haro, Canyon Country, CA (US); Edward Kummer, Santa Monica, CA (US); Jason Guenther, Bellevue, WA (US); Paul Yanover, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 281 days.

(21) Appl. No.: 11/165,772

(22) Filed: Jun. 24, 2005

(65) Prior Publication Data

US 2006/0293103 A1 Dec. 28, 2006

(51) Int. Cl.
*A63F 9/24* (2006.01)
*A63F 13/00* (2006.01)
*G06F 17/00* (2006.01)
*G06F 19/00* (2006.01)
*G06F 3/00* (2006.01)
*G06F 13/00* (2006.01)
*G06Q 30/00* (2006.01)
*G07G 1/14* (2006.01)
*H04N 7/16* (2006.01)
*H04N 5/445* (2006.01)

(52) U.S. Cl. .............................. 463/42; 705/14; 725/23; 725/60

(58) Field of Classification Search .................. 463/42; 725/23, 60; 705/14
See application file for complete search history.

(56) References Cited

U.S. PATENT DOCUMENTS

| 4,861,031 | A | 8/1989 | Simms |
| 5,411,259 | A | 5/1995 | Pearson et al. |
| 5,926,179 | A * | 7/1999 | Matsuda et al. ............. 715/752 |
| 6,178,408 | B1 * | 1/2001 | Copple et al. ................. 705/14 |
| 6,200,216 | B1 | 3/2001 | Peppel |
| 6,758,754 | B1 | 7/2004 | Lavanchy et al. |
| 6,758,755 | B2 | 7/2004 | Kelly et al. |
| 6,769,983 | B2 | 8/2004 | Slomiany |

(Continued)

OTHER PUBLICATIONS

Bullfrog Productions, "Sim Theme Park," Nov. 4, 1999, Electronic Arts.*

(Continued)

*Primary Examiner*—Xuan M. Thai
*Assistant Examiner*—Kevin Y Kim
(74) *Attorney, Agent, or Firm*—Marsh Fischmann & Breyfogle LLP; Kent A. Lembke (57) ABSTRACT

A system of interaction between an electronic theme park experience and live theme park interaction and activity earns rewards. The interaction permits for rewards earned in the electronic theme park experience to be redeemed in the live theme park experience and vice versa. The electronic theme park and live activity are interactive in real or delayed time through an Internet connection. Activities on one or both of the live and electronic formats are designed to drive increased player visiting of the live and/or electronic versions. The Virtual Magic Kingdom is a virtual version of Disney's theme parks, specifically the "Magic Kingdom" portion of the theme parks.

23 Claims, 6 Drawing Sheets

U.S. PATENT DOCUMENTS

| | | |
|---|---|---|
| 6,824,469 B2 | 11/2004 | Allibhoy et al. |
| 6,967,566 B2 * | 11/2005 | Weston et al. ............ 340/323 R |
| 7,022,017 B1 * | 4/2006 | Halbritter et al. ............. 463/42 |
| 7,128,652 B1 * | 10/2006 | Lavoie et al. ................. 463/42 |
| 2001/0039206 A1 | 11/2001 | Peppel |
| 2002/0052238 A1 | 5/2002 | Muroi |
| 2002/0147640 A1 | 10/2002 | Daniele et al. |
| 2003/0018523 A1 | 1/2003 | Rappaport et al. |
| 2003/0083943 A1 * | 5/2003 | Adams et al. ................. 705/14 |
| 2004/0078263 A1 | 4/2004 | Altieri |
| 2004/0147319 A1 | 7/2004 | Aviyants |
| 2004/0177007 A1 | 9/2004 | Van Luchene |

OTHER PUBLICATIONS

Bullfrog Productions, "Theme Park World," 1999, Electronic Arts.*

* cited by examiner

PARTICIPANT INTERACTION WITH ENTERTAINMENT IN REAL AND VIRTUAL ENVIRONMENTS

BACKGROUND

This disclosure relates to real world and virtual world interaction particularly in the field of entertainment. The present disclosure relates generally to awarding, accumulating and redeeming rewards using an electronic system.

One exemplification of the disclosure is in relation to theme parks, and in particular in relation to a theme park with multiple different forms of entertainment centers.

A number of systems exist for awarding promotional incentives to encourage purchases of goods or services. These incentives have included specific award items or discount offers from catalogs, based on the volume of activity in an account. Other promotional systems have involved discounts on goods or services offered by third parties. For example, discount coupons have been offered for airline tickets based on a minimum level of investment at a bank or savings and loan. Holders of bank cards have been offered discounted or free air travel based on a certain level of activity using a general purpose charge card or have been credited with frequent flier miles based on activity in a charge card account. Stores or businesses also issue their own charge cards and awarded store credit based upon amounts charged to the card.

SUMMARY OF THE DISCLOSURE

The present disclosure relates to a theme park environment in a live sense and in an electronic sense. There are at least one and preferably many remote terminals connected through the internet to a web site. The site may also be connected with live activities being undertaken at the theme park in real time. An interactive game can be played with players at the park through the internet connection. Rewards earned in the electronic format of the theme park can be transferred to or redeemed in the live format or vice versa.

A system of networked computers at various remote or At Home locations is connected with a web server that can be connected with computers at the theme park. These terminals can all communicate with a central control center. Each of the networked computers records and transmits data relating to activities at the remote At Home users. The central control center then uses the data in combination with previous performance data to provide rewards in goods or services to the program participants.

Methods and apparatus for networking or associating a plurality of electronic devices such as systems to a common controller and awarding, tracking and managing rewards based upon account activity of a player who has a unique identifier. When the player accesses the theme park activities in the live, namely In Park, there are predetermined rewards which are redeemable when the system is later accessed At Home. Rewards can also be earned and then redeemed in the opposite fashion.

The At Home theme park experience permits for the theme park live experience to be emulated by a player. As such the electronic player can develop different experiences to more or less mimic live them park activities, for instance different lands in the park. A player can develop an online identity for the electronic version of the theme park experience.

There is provided a business method to drive attendance at a theme park utilizing a virtual multiplayer game that simulates areas in the theme park. A player can win a code that can be used in the virtual game by attending the real world theme park. For instance, a player can buy a hat in the real world theme park that provides the player with a code that the player can then utilize when playing the virtual game at home to get a hat in the virtual game.

A player can also obtain codes or redeem points towards a prize in the real world based on game play in the virtual game. For instance, the player can earn points towards a pin or hat in the real world. In another aspect, the player obtains special abilities, such as magical effects by playing the virtual game at a terminal in the theme park. The player may also obtain certain prizes for creating the virtual character at a theme park terminal.

In one form the disclosure concerns Disney's Virtual Magic Kingdom. This is an online, preferably free, multi-player game that lets participants experience the magic of Disney Theme Parks from home. (Disney, Main Street, Disneyland, Magic Kingdom, Virtual Magic Kingdom, Tomorrow land, Fantasyland are Trademarks of Disney Inc.). Virtual Magic Kingdom will sometimes be referred to herein as VMK. Participants can experience being inside of Disney's virtual world, and can create their own experiences, control their online character and interact with players from around the globe.

Preferably this is not directed to any one theme park. The virtual theme park can borrow or use signature elements from many theme parks. This serves as an online extension of different theme parks, and preferably the Disney theme park experience worldwide.

A participant preferably visits a Disney theme park and enhances the chance to win prizes, magic spells and surprises. Such a visit thereby enhances the on line visit to the virtual theme park and game play at that park.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
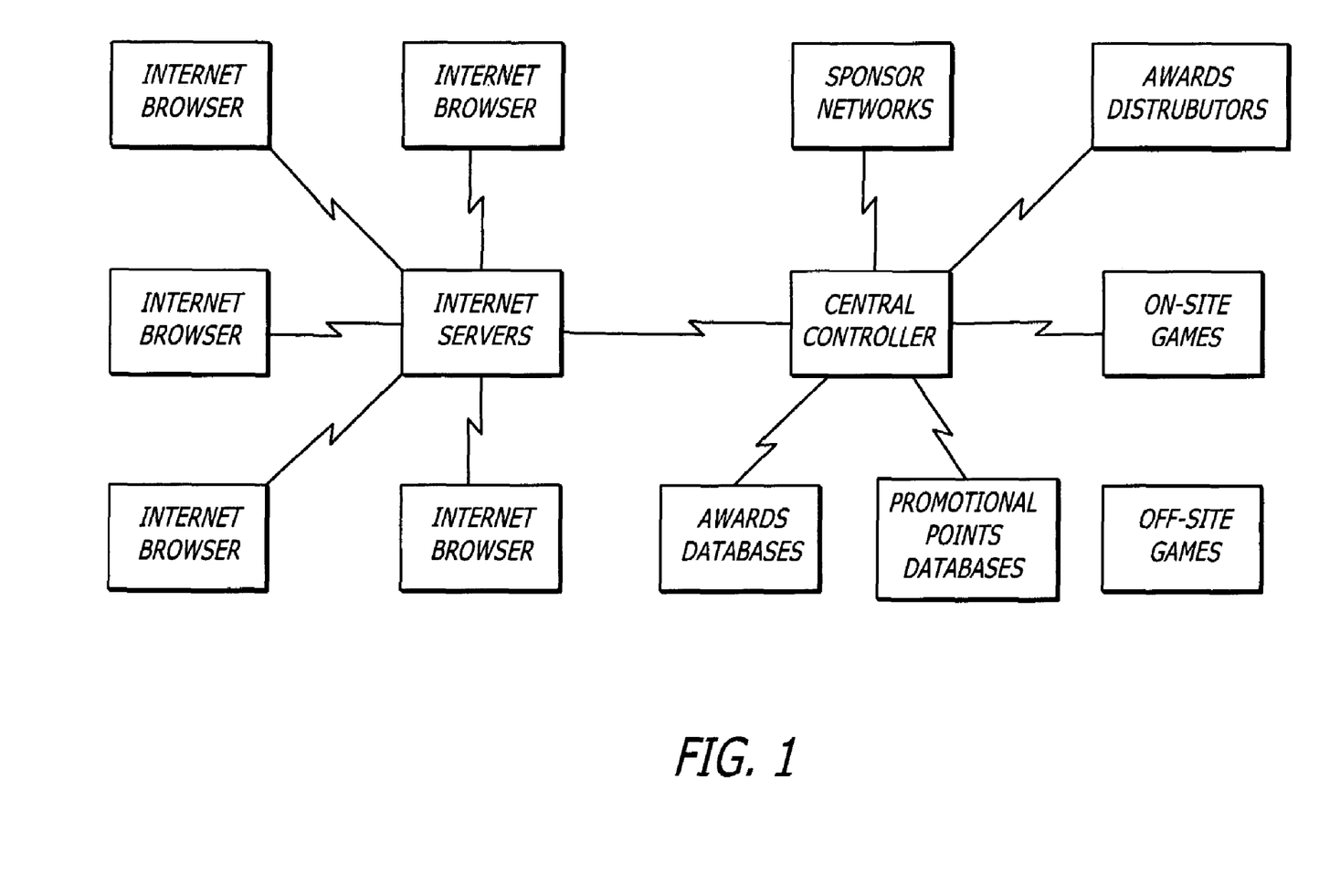
FIG. 1 is a block diagram of a system according to the present disclosure.
Figure 2:
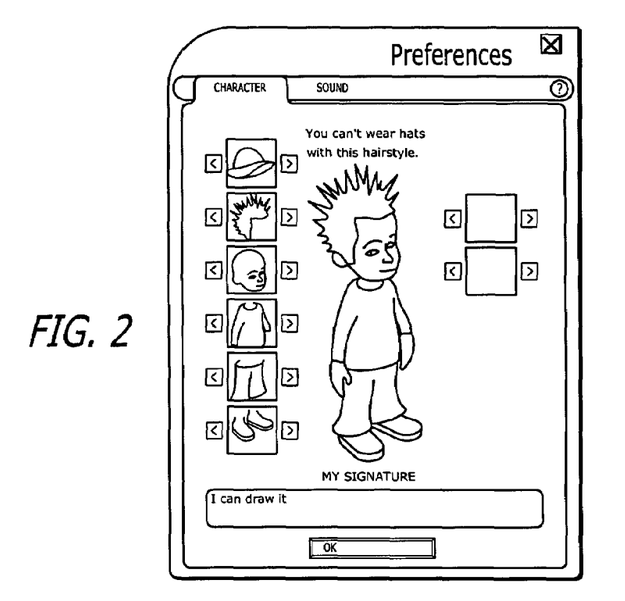
FIG. 2 is an embodiment of a display in which the preferences for a character in the virtual system are chosen.
Figure 3:
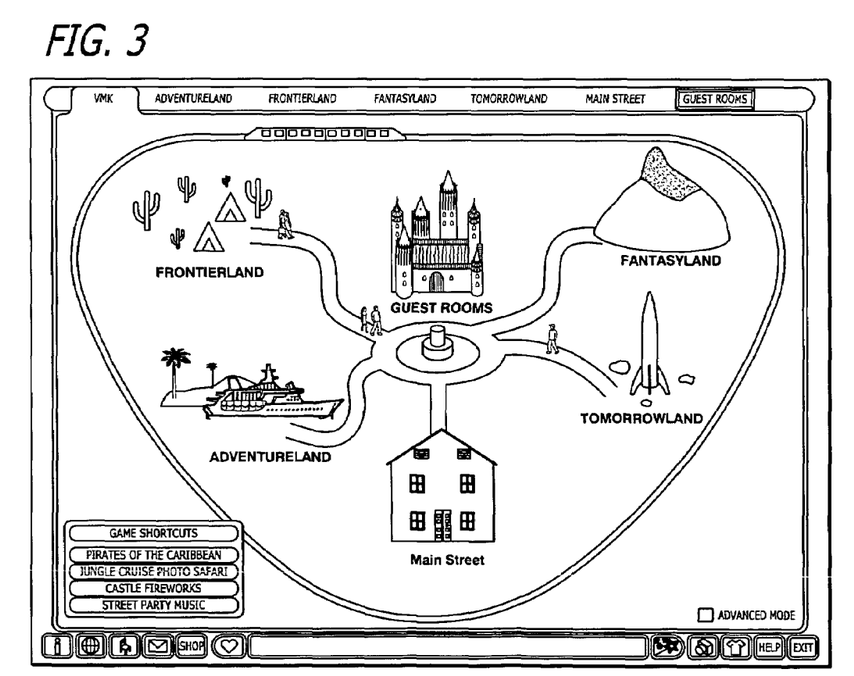
FIG. 3 is an embodiment of a display for a virtual layout of a theme park.
Figure 4:
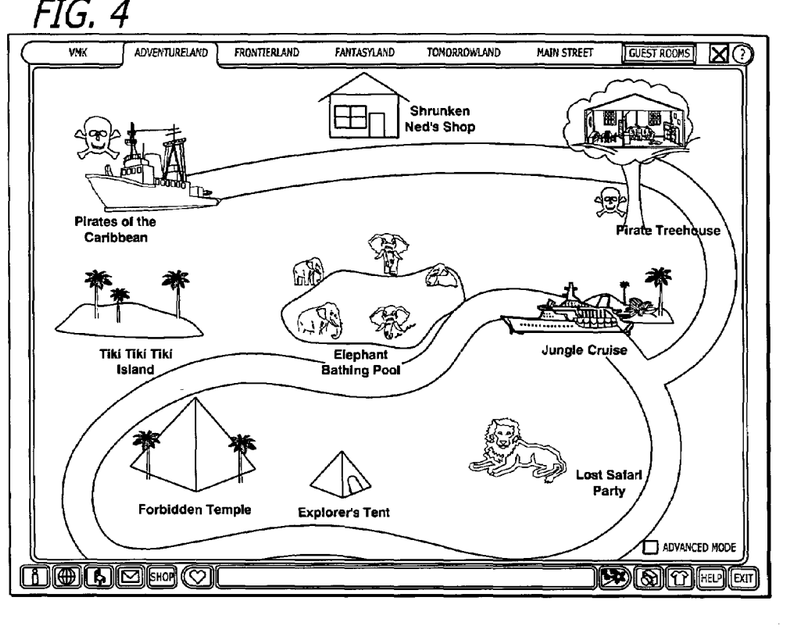
FIG. 4 is an embodiment of a display of one of the areas selected in the embodiment of FIG. 3.
Figure 5:
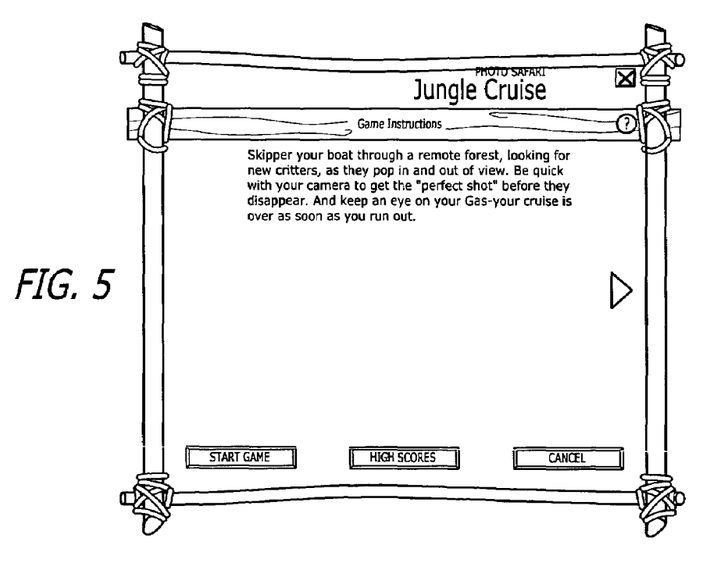
FIG. 5 is a screen shot of one embodiment of a game that can be played within the virtual layout.
Figure 6:
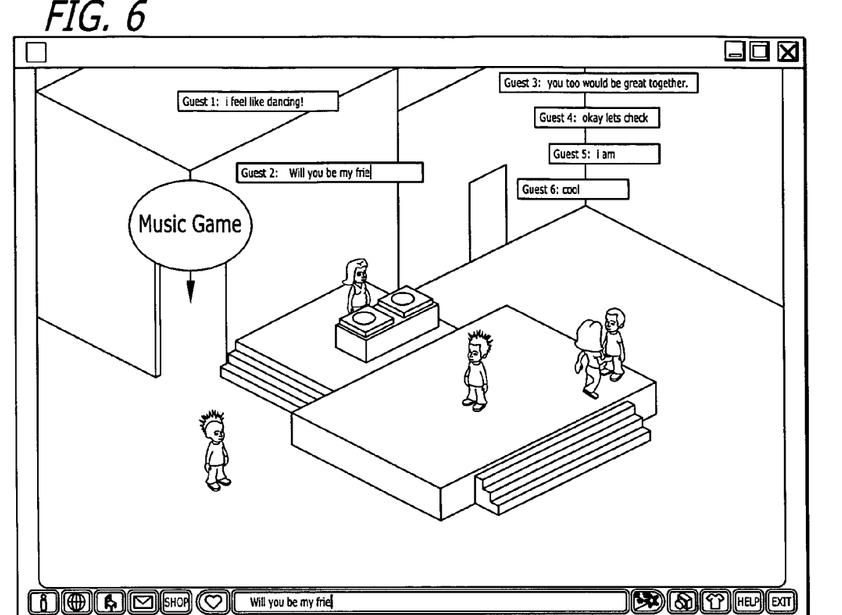
FIG. 6 is a screen shot of players in the virtual world interacting in a virtual dance hall.
Figure 7:
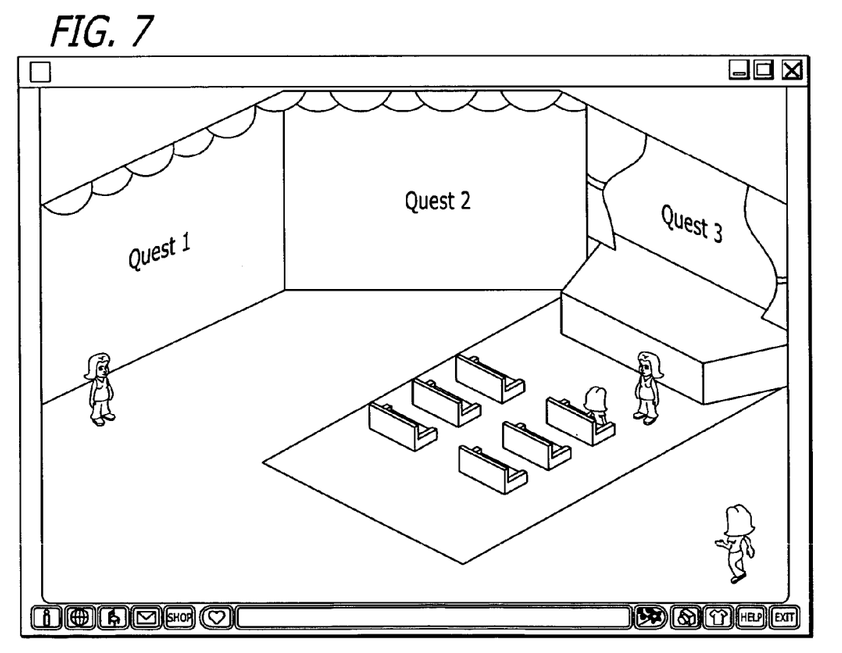
FIG. 7 is a screen shot of a virtual room in which players can make a selection to obtain instructions to go on a quest in the theme park.
Figure 8:
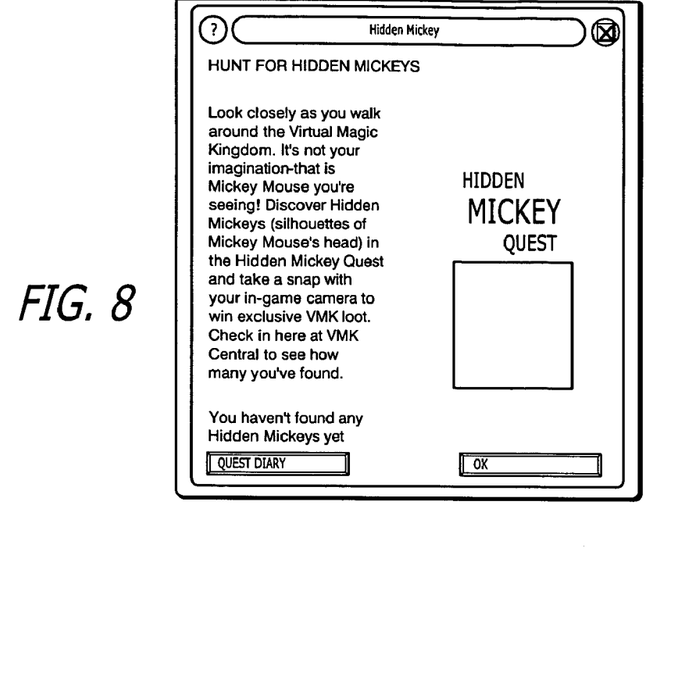
FIG. 8 is a screen shot of one of the quests that can be chosen from the virtual room illustrated in FIG. 7.
Figure 9:
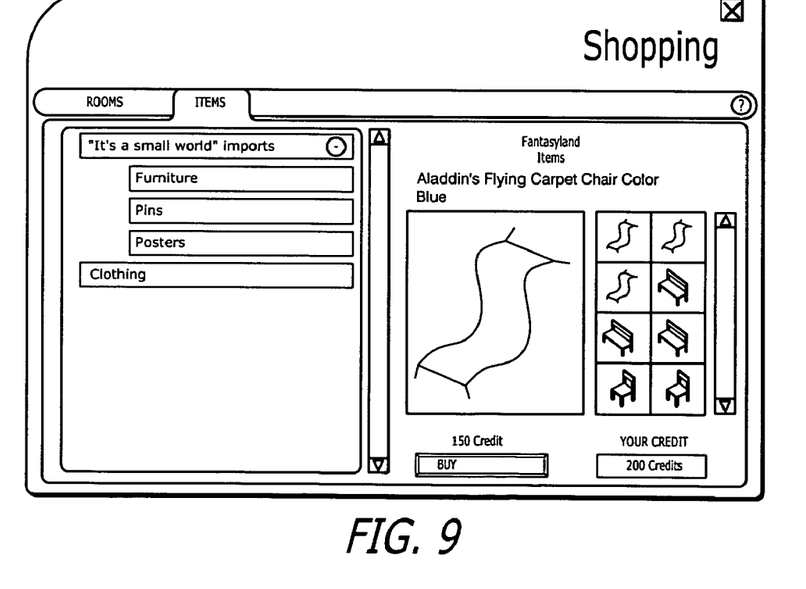
FIG. 9 is a screen shot of a shopping display that allows the user in the virtual world to purchase items.
Figure 10:
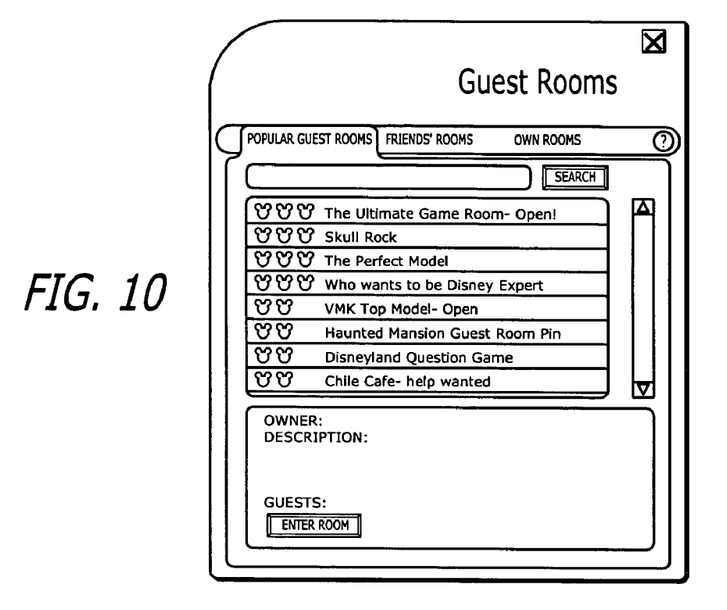
FIG. 10 is a screen shot of guest rooms that the user in the virtual world can enter.
Figure 11:
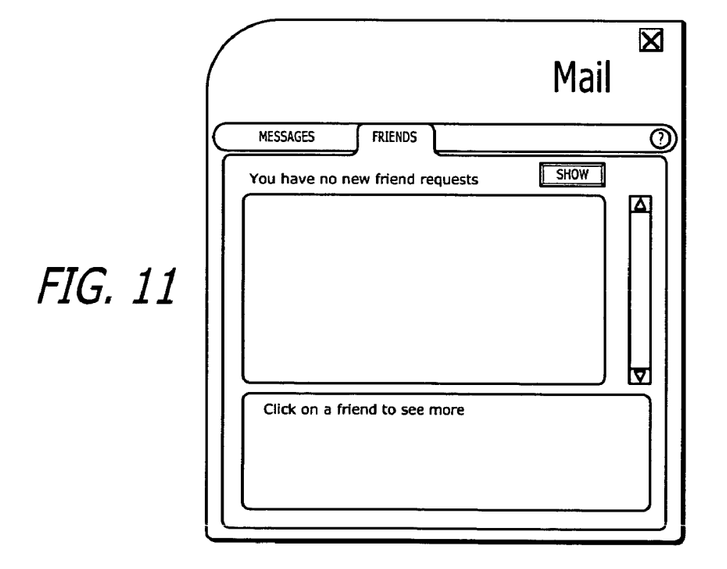
FIG. 11 is a screen shot of a mail display that is utilized in the virtual world to communicate with others in the virtual world.

The Virtual Magic Kingdom (VMK) creates a virtual complement to at least a portion of a theme park. A massively multiplayer game world is created where users can socialize, collect personal items, and play games. The activity in the real environment or real world is termed "In Park". The activity in the virtual environment is termed "At Home".

The disclosure is directed to an At Home game that drives In Park visitation. In one embodiment, merchandise codes are utilized to drive In Park visitation. This selectively yields virtual merchandise at home. An In Park creation of an avatar is selectively special or creates enhancements or provides bonuses for At Home inventory. This may, for instance, permit the printing of forms and/or coupons At Home that are redeemable in the theme parks in an In Park environment.

A system of interaction between an electronic theme park experience and a live theme park experience comprises an interaction permitting for rewards earned in at least one of the electronic theme park experience to be redeemed in the live theme park experience or for rewards earned in at least one of the live theme park experience to be redeemed in the electronic theme park experience. There is a network accessible to connect the electronic theme park and live theme park such as to be interactive in real or delayed time through the network. Activities and rewards on one or both of the live and electronic theme parks are designed to drive increased player attendance at the live and/or electronic versions of the theme park.

The system includes an interactive game, the game being for operating on a computer and for being viewed on a window of a display on a screen in the live theme park and in the electronic theme park. At least one subject of the window of the electronic version and for the live theme park includes the interactive game.

The system includes the display of rewards or benefits obtainable at the live or electronic theme park, the rewards or benefits being earned in the other of the live or electronic theme park. An awards display window is configured to display a plurality of awards for which a player may redeem rewards. The system is configured to increase the rewards in response to an aspect of a player's activity in at least one of the theme park formats.

Other features of the system provide a chat room for players to communicate with other players on-line with the electronic theme park. The system permits each player in the electronic network to selectively adopt a unique identity, the unique identity being selectively related to a character of the live theme park. Also the system permits individual players to design and modify selected areas in the electronic theme park adopted by them. The system can permit players of an electronic theme park to have the ability to invite other players playing selectively in at least one of the live theme park or in the electronic theme park to enter a selected area of the theme park of the players.

There is provided a system of interaction between an electronic theme park experience and a live theme park experience. There are remote terminals, a central controller; and the remote terminals are in communication with the central controller. The system is configured to retrieve and display a rewards of a player accessing the remote terminal. There is a rewards database accessible by the central controller and from which the rewards of the player are retrieved, and the remote terminal is in communication with the central controller through a network connection.

Also provided in this disclosure is a method of interaction between an electronic theme park experience and a live theme park experience comprising interactively awarding rewards. A unique identifier is assigned to a person; rewards being goods or services are awarded to the uniquely identified person for predetermined activities involving transactions at an electronic theme park experience or the live theme park experience. The redemption of rewards for goods or services to the uniquely identified person is for predetermined activities at the other of the electronic theme park experience or live theme park from which the reward was earned.

VMK provides fans with a family oriented, friendly, and safe place to meet other people, chat and play games. A main target group of the VMK is preferably "tweens" (pre-teenagers) and teens, between the ages of 8-14 years old.

The Magic Kingdom constitutes of public and personal spaces, or "rooms." In one embodiment, the layout of the Magic Kingdom includes be a mixture of the different theme parks, mostly resembling California Disneyland. The public spaces are themed according to the various lands and attractions within the Magic Kingdom. Players use a navigator within the "virtual map" to directly jump between locations, walk around the park from one area to the next or use a Monorail for transportation.

The public spaces of VMK (Fantasyland, Tomorrow land, etc.) selectively contain several multi-user games. The players can spend their time in public spaces or they can create their own personal rooms, which they can personalize. These personal rooms also reflect the themes of the various lands within the amusement park, with Main Street being the default theme.

Players can possess a variety of items, which are selectively titled "Charms." A charm can represent a pin, a furniture item, an article of clothing, or a magic spell. To increase the relative value of a charm, certain charms are more difficult to acquire, and other charms are only available to those players that physically visit the parks. Charms can also be traded between players.

The average players' activities in the Magic Kingdom can consist of socializing with other players, collecting and trading charms, competing for high scores in the multi-user games, and personalizing their own rooms.

The disclosure is further exemplified in reference to the following examples.

Lands Inside VMK

The Main Street U.S.A.® area in VMK, much like in the real Disney parks, is themed after small town America and is the gateway to the other magical lands. In the VMK Main Street, U.S.A.® area you can stop in the Main Street Music Club to mix your own theme park music, then spin your mix at the Club for everyone to enjoy. There are shops from where to acquire unusual furniture to decorate a player's own virtual room.

The Adventure land® area is a realm made up of the world's far-off places and uncharted regions where you can experience a new, very interactive twist on the classic Jungle Cruise attraction.

In the Fantasyland® area enchanted tales adapted from classic Disney animated films come to life. This is the place for your character to acquire rare and special magic spells. This is the place where you can play the Castle Fireworks Game.

The VMK can also include the Frontier land® and Tomorrow land® areas where new multi-player games feature the Haunted Mansion and Space Mountain® attractions.

Live in the Kingdom

VMK lets you experience the magic of Disney Theme Parks from anywhere in the world. Explore the hidden mysteries of Adventure land, travel back in time down Main Street, U.S.A., take an enchanted journey into Fantasyland or conquer a bold adventure in Tomorrowland while being at home.

Build Your Character

A player can choose from many hairstyles and clothing ensembles. Remixing Disney costumes is possible to create one's own unique look. Change your appearance instantly and as often as you like. More fun is possible if a player wins one of the magic special effects.

Design Your Own Room

Players can create their own room in the Kingdom when you join the game. The more you hang out and play, the more credits you get to spend on furnishings. A huge selection of stuff to collect and trade—from pirate thrones to futuristic teleporters to hippo carpets and many other surprises.

Hunt for Hidden Mickeys

As a player walks around the Virtual Magic Kingdom, different hidden Mickey Mouse (silhouettes of Mickey Mouse's head) ("Hidden Mickeys") in the Hidden Mickey Quest can be found and a snap with your in-game camera is possible to win exclusive VMK material.

Compete in Multi-Player Games

Players can battle with friends or rivals in the Pirates of the Caribbean Game. Players can compete to be the best fireworks designer by competing in the Castle Fireworks Game. The fun of VMK is multiplied by thousands of players from around the world who are experiencing the magic with other players.

Games to Play

Pirates of the Caribbean Game: Rip cannon fire at your enemies, loot hidden treasures and battle Caribbean forts when you team up with other invaders as the captain of your own pirate ship.

Jungle Cruise Photo Safari Game: Brave the untamed rapids of the Jungle Cruise on your quest for wild animals in the Jungle Cruise Photo Safari Game. Capture them with your VMK camera and earn points for every animal you photograph. It is an adventurous photo safari that earns you more stuff for your room with every safari.

Castle Fireworks Game: Test your reaction time in this game of quick clicks where you compete against hundreds of other people to become the greatest fireworks master. Explode a display of light and sound.

Street Party Music Game: Mix and play your own music and create a rockin' music jam just off Main Street, U.S.A.® in the Street Party Music Game. Open the easy-to-use mixer to create your own tracks. Play your music for the crowd jammin' in the alley.

VMK at the Disneyland® Resort or at Walt Disney World® Resort

An in-park visitor to VMK Central in Disneyland® park at Disneyland® Resort or at the Magic Kingdom® Park at Walt Disney World® Resort can play VMK online, begin VMK Quests, or redeem prizes at this location. VMK characters created inside Disneyland® park or the Magic Kingdom Park® receive an exclusive "Born in Park" icon in its profile, giving that character "special" status.

VMK Quests

Guests that visit VMK Central can select from a collection of Quests cards to answer during their day inside the park. The Quest is like a trivia treasure hunt where guests are challenged to find hidden facts about the park throughout their day. Each Quest contains 3 levels of questions (easy, medium, and hard). Guests "scratch off" their answers and bring the card back to VMK Central to redeem for prizes. Prizes are based on how many levels were completed correctly and how many quests were completed.

The prizes, for instance, are collectable trading cards, which contain a secret code that can be entered online to receive cool virtual gear, magic spells and fun surprises to enhance VMK game play. There can be a VMK bracelet similar to the "Live Strong" style of bracelet. The VMK version glows in the dark. It also contains a secret code. Another prize is a one-of-a-kind VMK tour at Disneyland® Park and the Magic Kingdom® Park: players who earn the tour can bring their family on this 90 minute adventure and get behind-the-scenes scoop on what is happening with VMK, plus a collection of trading cards and secret codes to take home.

Guests who purchase selected items at participating Disneyland® Park and Magic Kingdom® Park locations can receive a card with a unique secret code that can be redeemed online for a special and exclusive virtual accessory for VMK.

In VMK, each player is represented by an avatar, a human character in the game. The engine used to visualize the avatars is an avatar engine, modified to utilize the graphic assets used in VMK. A player creates their avatar when first logging into the game, and the created avatar is stored in a player database. Information collected and stored about each user includes: avatar name, and avatar slogan/mission statement.

The avatar registration system considers information about avatars. Account information such as email address and user age is handled by the Disney Global Registration system. If the avatar name chosen by the user is already taken, the game suggests additional naming variations, easing the registration.

Players can customize the avatar's looks by choosing a set of clothes, which are then used to visualize the avatar's looks. The clothing available to users is predetermined. Users can open an avatar profile ("ID card") of other users. The profile will include basic statistical information about the other user. The data is represented using icons.

Special avatar profile data is created for avatars created from kiosks in Disney theme parks. This data can be used to identify the avatar that has been created in-park. The location creation data will be provided to the Game Engine by the Global Registration's account handling system.

The information shown in the profile can include:

Different levels of achievement for each multi-user game; has been on the winning team at least one game; has been on winning team at least fifty times and been overall game winner at least once; has been the best player of the week at least once.

Integration with Disney Global Registration System

The VMK registration process integrates with Disney's Global Registration system, allowing people to use the same user ID and data In VMK as in other Disney sites using Global Registration system. New users register an account into the Global Registration system, which then passes the user to the game engine with a session ID that can be quelled to result in a SWID (Global Registration user ID). The game engine detects if the SWID is a new or existing user. In the case of a new user, the system prompts for a name and forces choosing the avatar's looks. In the case of an existing user, the user is simply logged onto the VMK. The technical integration between VMK and Global Registration is done via an XML-RPC interface.

Public Spaces, Rooms and Screens

A room (and screen) refers to a single location in the VMK virtual space, which is visible on the users computer screen at one time. The screens cannot scroll, which means each "screenful" of graphics function as a whole. An example of a screen is one room in Habbo. In VMK, one room can be a user's own guestroom, or a part of the park such as the Hub on Main Street. The screens can be linked together so that users can walk from one screen to the other, thus creating a sense of a larger space.

VMK can include two different graphics scales for the screens. The smaller scale (small avatars) is used in public areas, which represent the park and the larger scale (bigger avatars) graphics are used for users own rooms. The graphics scale is chosen so that same avatar graphics can be utilized for both scales by means of scaling down the larger scale graphics to fit the smaller scale.

Alternatively there can be only one scale of graphics, which would be utilized for both public spaces and the private rooms. This would allow wider use of graphic assets and enables making the private rooms closer to the part setting than the large scale, which enforces quite small rooms.

Navigator

The Navigator allows players to pass from one room to the other within the VMK game. The Navigator is available in the game navigation, regardless of where the user currently resides in the game, and allows the user to jump to any other space in the game instantly. The Navigator is divided into a public space navigator and a guest room navigator.

Navigating to Public Spaces

The public spaces are accessed using a visualized map of the Virtual Magic Kingdom. The players choose an area on the map. After choosing the area, a more accurate representation of that area is shown (zoom). The player can then choose a room in that area and be transported to the location, given that there is free space available in the chosen room.

Navigating to Guest Rooms

The Guest Rooms are listed as a textual list, sorted by activity in the room. Users can search for room names by entering a text string. Only Guest Rooms where the owner is present are listed in the Navigator, and can be entered by other users.

Chat

VMK allows users to communicate with each other via chatting. When entering those messages they will appear as "speech bubbles" atop the avatars' heads. Avatars are not able to hear that messages of avatars further away; instead their messages appears garbled.

The default mode for chatting is "canned chat." Canned Chatting is implemented with a predictive/dictionary-based input system. The chat database can include approx. 1,000-2,000 words (to be provided by Disney) which users are allowed to use in messages. When typing letters, users see the available words for those letter combinations, and can select a particular word to be included in the that message. This list can be updated at any time using the VMK back-end tools. The list will be downloaded by the client software on startup, meaning the client uses a list for the duration of a single log in even if it is updated during the log in. The server updates the list immediately, however, and immediately start to enforce the new list.

Users have the additional ability to enable free textual chatting with other users. Free chatting enables with a parental consent form. A user wishing to enable free chatting gets a parent with a credit card to sign a waiver document, and to enter the credit card info as proof of age. An automatic back-end system processes the application, and upon successful completion enters the free chat consent into the user database.

Users with both canned that and free chat status is available to access essentially all spaces in the game. Canned/free chat status is displayed as an icon next to the avatar, as well as in the Avatar Profile view.

Users with canned chat can see a) messages from other canned chat use; and/or b) messages from free chat users, which only contain words from the allowed word list. This ensures that friends can talk with each other, even if one of them is a canned chatter and another one a free chatter. Free chat users will be able to see messages from everybody. Non-approved words will be rendered as black boxes to the canned chat users.

Emoticons

Users are available to express their feelings using emoticons, icons for different emotions. Emoticons will include smiling, sadness, frowning etc. Emoticons are selected from a menu, and displayed on pores raised atop the avatars' heads.

Messaging

VMK features an in-game instant messaging system called the Messenger. Available via a console button in the game navigation, the Messenger allows users to send Instant messages to each other. Messaging between users is subject to the same restrictions as chatting. The default mode is a canned message, using the same system as the chat system. The instant messenger honors the same chatting preferences (canned versus free) as chatting. The messages can only be sent between two users if they are marked as friends. Marking someone as a friend works by requesting the other user to accept you as a friend (choose the other user in game, click "ask to be your friend button." The requestee is then be notified of the request on his/her console. If the user accepts, the users are now linked as friends. Both parties are free to remove the friend linking at anytime, at which point the link will be lost in both directions.

Help and Tutorial System

The user interface contains an icon, which lets the user open a simple menu-driven help system. The help system interface includes a host character. The help content is written as if the host is speaking with the end user. This is expected to make reading the help easier for the younger users. Upon first entering the game, a tutorial is activated. The tutorial is implemented using the help system Interlace and goes through the following features: 1) navigating in VMK; 2) creating the user's first room; 3) instructions on how to start collecting charms, including information about getting rewarded for visiting the parks; 4) Trading; 5) communicating with other guests; 6) Avatar Creation & Modification; and 7) tips for starting the game play (first two weeks).

The game has a menu-driven help system, available anytime by clicking on the help icon. The menu system includes popular help topics, and answers to FAQs. The help menu also allow users to request help from system administrators and/or moderators. The help request is shown for all moderators and administrators who are logged onto the game at the time the request is sent.

Credits (Rewards)

In one embodiment, the player has a credit account. The credits are used as a currency in VMK. Players are awarded credits for having spent time in VMK and for visiting the real Disney Parks. The economy of VMK is tied to credits. Players are not being able to trade credits. Trading is restricted to trading Charms only. Players can redeem charms back to credits at a flat low rate. Prices for the items are changeable with the administration tools Currency is represented in a wallet or similar concept, menu that is openable at any time. The menu tells the user their current account balance and link to instructions about getting more credits.

Charms (Rewards)

In one embodiment, players can possess various items and abilities in VMK including magic spells, furniture, clothing, and pins. VMK has one common metaphor, which can be used for dealing with all these different types of possessions, even the very abstract ones. The metaphor will act as a vehicle for trading and collecting the possessions. The objects are called "charms". Charms are handled using an Inventory screen.

The Charm Inventory is the tool players use to manage their possessions. When opened, the inventory provides a user interface, which lists every item the user possesses, except for Items the user has used to furnish his rooms. Each separate type of item—pins, furniture, magic effects and clothes—have a separate area In the Inventory. In the Inventory, the items have the following representations: pins are represented by the picture of the pin. Furniture is represented with a smaller picture of the item. Magic Effect is a symbolic picture representation of the effect. Others are presented by a frame of the cloth images.

The inventory can be opened when the user is in private or public moms and not playing a game. The inventory allows users to sell items back for a small flat fee. System administrators can mark types as non-sellable.

When the players are in one of the public rooms or their own guestroom, they can open a charm product catalog, which lists all Charms, which are available for purchase and let users spend their credits for purchasing Charms. Some rare charms are not available for purchase. The rare Items can be acquired only by going to Disneyland or other Disney parks, or by participating in the VMK world. A product catalog is built from catalog pages, which contain the products available for sale. VMK can contain multiple catalogs, which are built from a common set of catalog pages. This will allow building special catalogs, which have only a small set of Items for sale. These catalogs can be specified to be openable only in certain locations of the park.

Charm Trading with other users is possible when a user clicks on another user's avatar and then click the "trade" button in the VMK interface. Next, a trading dialog appears. Users can then drag items into the dialog from their inventory, cancel the trade or mutually accept the trade. Bartering is handled by having the dialog open and chatting about the items in trade while changing the trading dialog contents. This allows users to make proposals and counterproposals about the trade.

Charm types include furniture Items, which means any items, which can be placed to a room for the purpose of furnishing the room; furniture allows players to personalize their own rooms. The furniture is built in sets. Three basic sets are built along with a themed set for each land. Each set consists of between five and ten furniture Items. Base sets of furniture should contain chairs, tables, sofas, beds, or "dividers." Dividers allow players to modify the layout of their rooms. For example, in Habbo the bar desk pieces are extremely popular object since they allow players to customize a generic room layout. Furniture can be anything that is not a pin, item of clothing or magic effect. It could be a sword, a light chaser, ride vehicle or trophy. Some Items are interactive such as dice. The Item interactivity will only change the Item's graphics and no menu-driven functionality is created for the Items. The items are handled by double-clicking the item. For example, double-clicking a dice will cause the dice to produce a random number.

Food storage item which, when double clicked, shows a short animation and the user then receives a temporary food item into the Avatars hand. The food item will automatically disappear after a while. The feature can for example be used to create a fridge, which gives users ice cream, or a drink dispenser, which gives use, soda.

A Randomizer—when activated first displays an animation and then show a randomly selected end animation frame, which are pre-drawn.

Can: is used to create a dice, which first rotates and then stops to show a number. Animation player—which is turned on or off by double-clicking. When on, will loop through a set of animation frames. When off, will show one frame in the place of the animation. Can be used (or example to create a television set or a fireplace.

Gate: when double-clicked will open or close. When open, the gate will let users pass through, when closed will prevent walking to the same square.

Teleporter: when purchased, the user receives a pair of teleporters. If both are placed to a guestroom and one of the teleporters is double-clicked, the user's avatar walks into the teleporter, an animation is played, and the user is transporter into the other teleporter. The two teleporters can be placed into different rooms, which will allow linking rooms.

Pins include a simple pin collector system. The user can acquire pins by purchasing them from the item catalog or get them as rewards. The pins appear in the users Inventory, from which the user can choose to wear up to five ten pins at any time (e.g. very rare at' otherwise special pins). When a user's ID card is opened, the card will show the pins worn by the user at that time. The list of pins is determined during the design phase of the project. Pins can also be displayed in a guest's room by putting them onto the room walls like posters.

Magic Effect

Magic Effects are charms, which can be triggered to perform a visual or aural effect. Ideally the effects are tied to the iconography found in the parks. Each individual Magic Charm effect has one function. An example Magic Effect charm could be a Haunted Mansion effect which allows the user to turn his avatar transparent for a short moment.

The effects could include sound effects, such as folly sounds and visual effects, such as invisibility and firework-like illusions. The effects can be used in personal and public rooms, provided the player has the necessary Charm required. The multi-player games require all the processing capability of the client and thus the effects cannot be used during the games.

The effects are expendable and when a Charm has been used, it cannot be used again immediately. The Idle time during which a Charm cannot be used varies depending on the Charm. The magic effects are triggered in a separate Magic menu, which will show a pictorial representation of the effects, the user possesses. Beside each effect pictogram, information about the effect status is shown.

Clothing

The game avatars clothing/looks are separated into 5 categories: head, face, upper body, lower body and shoes, Certain articles of clothing for each group will be unisex, clothing for both boys and girls. When choosing the clothes for the avatars, some clothes will offer a selection of colors. The skin color of the characters is defined by the color of their face, which is selectable in the avatar customization menu.

A base set of clothes is available to all players. Players can also own clothing as Charms, when choosing a character's appearance, the player can choose from additional clothes based on the Clothing Charms. The clothes become available in the avatar creation tool immediately when the user acquires the piece of clothing. The clothing will be created as a set of shapes, which have multiple color choices each.

Base Sets of Inventory

Multiple sets of Base Inventory packages are created, providing avatar, with different amounts of inventory (depending on where they were created). These Sets include, but are not limited to:

1. At Home—Standard Inventory
2. In Park—larger Inventory
3. Partner Location—Standard plus limited Special Inventory
4. Guest Rooms VMK users can create and furnish their own guest rooms. The room layouts resemble various locations within the Virtual Magic Kingdom. Upon registration, the user can only use the main street theme when creating a room and create one room only. A mechanic will be created which limits the number of rooms and themes that can be used by the player in the room selection. Traveling to and between personal rooms s handled by using the Navigator. Each guestroom is only being accessible to user, when the owner of the room is present in the room. Administrators are able to set certain rooms to be only accessible by the In Park users.

Guest room themes and layouts the guest rooms are themed according to themes found in the parks. Players can furnish their own Guest Room by using Furniture/item Charms, and Pins. The player can pick up the Furniture Charm from his Inventory and drop it into the room. The furniture can be moved and some furniture can even be stacked. Only the room owner and system administrators can pickup and move furniture placed in rooms. If a user drops a piece of furniture in someone else room, a warning dialog is displayed that explains that this will in effect give the furniture to the room owner.

Camera

The Camera lets players choose art area of the screen to photograph, which can be toned in sepia colors and can be saved as a photo in the users inventory.

If a player possesses a camera, he/she will have a camera button available in the client interface. Clicking the Camera button will open the Camera interface. The photos can then be saved in the Inventory, and additionally placed on the wails of the users guestroom. The stored camera pictures cannot be shared by other applications due to technical Issues with accessing the data in standard formats. The camera requires the user possesses virtual film to take the pictures. Film can be bought from the Charm Catalog. The camera itself is not expendable but film will be expended by one frame for each picture taken. Users are also able to purchase a photo album from the Charm Catalog. The album can be placed into the user's guestroom. Pictures can be added to the album by dragging the picture from the users' inventory to the top of the album. Double-clicking the album will open the album, which will then show the contained photos and the photo captions one by one. Users can shuffle" through the photos contained in the album. A user can have multiple albums, each of which can contain a separate set of photos.

Multiplayer Games

VMK contains several multiplayer games, allowing players to play against each other in games themed after popular rides and lands in Disney theme parks. Signup-rooms (pre-show) for the multi-player games are located within the rooms of the public areas. One of the rooms in each public space will contain a notice board on which people can sign up for a game, when a sufficient number of players have signed up, the gamers are transported to the game arena for the duration of the game. There will be multiple pre-show rooms for each game type. Design note: when creating the layouts for the rooms, which allow access to the Instanced rooms, provide multiple doorways. Each different multi-user game can have multiple concurrent games with separate player teams running at any given time. The number of document games will be limited to a fixed amount, determined by the hosting resources and modifiable anytime in the future.

Game winners are rewarded. The whole team will get a small reward, the best player will get a reward and daily best players will get extra bonuses. Winners will be informed via messaging, and won items/credits will appear in their inventories. The games high scores are stored and made viewable for the players. Both individual and team scores are saved to promote team play. The high scores are published on the VMK website. The pre-show sign-up rooms for each game have a link to the high scores so that players will have easy access to the game scores. The games either utilize a room layout, which as been specially made for the game, or reuse existing public rooms as the game space.

Disney/Non-Player Characters (NPC's)

Virtual Magic Kingdom contains many computer-controlled Disney characters. The NPCs serve multiple purposes: They provide a source of income for the players, in the form of charms and/or credits. They provide a way to spend time and interact with other characters in the game without having to depend on other players. They give autographs, which are stored in an autograph book. Guests can take a picture of themselves with the NPC with the camera. They help guide guests and answer questions through the content published in the discussion menus. Since discussions with the characters work with "canned" chatting, the discussions are menu-driven. When initiating a discussion with an NPC, the player is presented with the NPCs initial comment, after which the player has a menu of choices from which to decide how to respond to the NPC. Turn-by-turn the discussion continues, until the player or the NPC ends the discussion.

Users can own an autograph collection book. The book is available for purchase in the charm catalog. If a user possesses an autograph book, every time the user talks to an NPC, the NPC's autograph appears in the user's autograph book if it isn't already present. The autograph images are the same size as the Camera pictures and the autograph collection book is implemented by reusing the photo collection books. The autograph can contain a pre-rendered image (full color picture of the NPC and it's autograph) and a caption (for example, the time of getting the signature).

An editor is used for creating the discussion dialogue. The dialogue script defines a few special commands, which, when activated, can be used to give the player a charm. The NPC's have limited memory capacity, which enable logical discussion flow with individual players for the duration of the player's visit to the NPC's room. If more than one player is talking to the NPC simultaneously, each player experiences a unique conversation, as if the other discussions are not taking place, a live moderator/administrator with appropriate privileges can take over the control of an NPC. The controller will then be able to walk In the NPC's room and discuss with the end users with the standard chatting functionality.

Parades

The Main Street has one room dedicated for signing up to the parades (Parades pre-show room). The room is accessible by 25 users total. When parade is not in effect, live floats, which are part of the parade, are in the room. Each float has room for five users who can climb on board. The first user to mount the float is on the driver's seat. An area in predetermined screens is reserved for the parade during the parade time. The avatars that are in that screen automatically walk out of the reserved area when the parade is set to start. When the parade starts, the floats move out to Main Street and slowly move through parade route. As the floats go over the edges of each screen they are moving through, they appear on the next screen. Once the floats go over the edge of the last screen, they appear back in the parades pre-show room.

Fireworks

VMK fireworks system has two modes, one for editing the fireworks and one for playing back the fireworks. The editing happens by entering a room with a 'fireworks editing console which will start the editor for the user. The editor has a selection of different fireworks shapes with several color options each. The user can select a total of 12 pieces of fireworks. After the fireworks have been selected, the user can "shoot" the rockets in a sky view. The order and timing in which the rockets are shot Is stored. The fireworks graphics is implemented using a dynamic particle system, which utilizes colored bitmap graphics as the particles. This allows the use of Disney-specific graphics as parts of the visuals; for example, a rocket might explode to a bunch of tiny small Mickey-ears shapes. Each user can have one stow stored at any time. 'The design of the fireworks is viewable in the editor as a preview. Editing the show is possible and there is viewing room when all users see the show.

For playing back the fireworks, there is another room, which will have a podium onto which one user can climb onto at one time. The room is constructed with a distorted perspective so that a small area in the front of the room is walkable by the users In the room and back of the room will be used for playing back the fireworks. As someone enters the podium, the users fireworks show starts. The other users present in the room can vote thumb up I thumbs down duping the show.

A line of the next 10 guests to play their fireworks show will be on screen. A display shows the name of the guest's fireworks show currently playing, along with the number of thumbs up. The final thumb count is stored and the users who got the most thumbs up during a day will be rewarded, The user also get a small reward each time they play out their fireworks. A scoreboard show the best 20 scores of the day, week, month, and all time.

Monorail

In one embodiment, VMK contains a Monorail, an additional means of navigating through the game as well as additional space for chatting, trading and meeting friends. The monorail consists of two rooms, which are linked in a slightly different way from the usual linking. One room in each land allows the users to access the Monorail Station. In the Monorail Station, a Monorail train arrives every 30 seconds. The train stops for a moment, during which users can walk into the Monorail Train Car. Each Train Car can hold up to 20 people at one time. 10 instances of the trains will be active at any time and appear on the stops sequentially.

Each VMK Land has a room, which has a doorway to an Instance of a Monorail Station. The trains travel sequentially from one stop to the other, allowing users to travel from one part of the park to the other by using the train. The instancing of the train and the stations allows for more user capacity with less graphics production work as a total of five copies of the Station and 10 copies of the Train are activated simultaneously.

Quests/Hidden Mickey Quest

Users can sign up for a quest in the VMK. The quest gives users a list of tasks like a scavenger hunt. Each task can be either a mission to shoot a photo of a certain place in VMK using the camera or finding an NPC character, talking to the NPC, showing up at a location, playing a game, or acquiring a ten. Each quest specifies a limited amount of time during which the user has to perform all the tasks. If the user is successful in performing all the tasks, the user is rewarded with some credits and/or a charm. When a quest is active, the user sees a quest Icon in the VMK user interface. Flicking the icon opens a dialog, which lists the tasks for the current quest. Each task notes whether the task has been completed or not.

Music and Sound.

Each area of VMK has distinct sound schemes, with music, ambient sounds and effects combined into an aural landscape. Sound schemes are composed in a way that they wont get thing for the users to hear, but instead enhance the gaming experience. The sounds are constructed from a set of sound loops played in a semi-random fashion. The sounds resemble the sounds heard in the parks. Ideally the same recordings are used. There is a preference setting in the user interface for changing volume and switching audio on and off.

Integration

Account registration process. To simplify the registration process, there is only one account for the users, which is then be used for authentication. This account contains the users authorization credentials (username and password) and personal Information such as birth date. Registration and authentication (Including age verification) will be performed via the Disney Global Registration System. After authenticating users, the access passes to the game engine, which will only handle the Avatars, and the data related than Avatar such as the Charms in the Avatars possession. Each Avatar would equal one SWID and all XML-RPC requests would identify the users with the SWID or a session ID.

In-Park Playing and Avatar Creation

In one embodiment, in-park playing will serve two distinct audiences: people who haven't played VMK before and people who have. The first In-Park is projected to run for the first 6 months after launch, and, it is conceived, that new shows will follow on 6-month intervals. A concept for the players who have already played VMK is that in-park playing allows the players to see and use new features before the home users. The Implementation of the concept will be partly integrated into the product and partly created as a feature of the physical space where VMK Is presented in park.

In-Park Hosted Show

There is an in-park hosted 15-30 minute show meant to guide new users into playing VMK. From the point of creating a client, which allows the show to operate, the show script Is assumed to be materially as follows 1. Video promo to hype the game provided by Disney.

2. Intro by host of high-concept (birds-eye of whole park) (Disney).

3. Build an avatar interactive. Host chooses a guest to turn into an avatar. A live shot of the guest is displayed on the big screen, juxtaposed against the guest's matching avatar as it's being built. Other guests begin making theirs and host switches the big screen display between guest stations to showcase the variety.

4. Tour of host's personal room. Guests are prompted to click on "My Guest Room" in the navigator and shown how to go to the host's room. The host's room is themed like the Haunted Mansion, and he encourages everyone towards elementary navigation by choosing a seat around the coffin table. He opens his inventory and adds a Madame Leota crystal ball head. She tells them that we can make our own versions of the rides by collecting props and teleporting from one room to the next in ride vehicles. With that, the host says, "Follow the leader" and steps inside one of many Mansion-themed vehicles that connect to the next room that's a homage to the familiar Grand Ballroom scene from the ride.

5. Tour of a Fantasyland Gardens public space. To show guests yet another way to navigate, the walking-tour continues through doorways that connect these 3 consecutive screens. Along the way we see a series of character meet 'n greets and In each instance the host shows us different ways of saying hello:

6. Alice In the Tea-Cup room and the host quickly types a greeting in the chat window.
7. Dumbo fly by and the host shows everyone how to wave
8. Belle dancing and everyone Joins In, then holds up an emoticon for how they're feeling so far
9. Tour of the Emporium on Main St. The host introduces the Idea of virtual shopping by showcasing pins, charms and furniture in different parts of the store. The host informs the participants they w be rewarded at the end of the show with credits, which they can use to shop at home.
10. Multiplayer finale game in one of the following locations (sequencing these throughout the day). Breaking into multiple rooms to play against at-home players where necessary.

In-Park Special Features

The VMK players who log onto the game in the park will have the following "special" abilities. Magic effects will be available to the in-park users one release before they become available to home users. The in-park users automatically gain access to all magic effects when they log on in the park. In the first release of the game, the home users wont have access to magic at all—the magic is restricted to in-park players only. With the second release, the home users can possess the first five magic effects and the In-park players will gain access to the next five effects. If a multiplayer game which has multiple levels, is started In the park, the In-park player who starts the game have access to a level which isn't available to the borne users. Since these games undoubtedly are very popular, the only way to guarantee immediate access to such a game will be to visit the park. In addition to the above features, the DLR and WDW spaces (may not be Innovations at WDW). Which is built in the park, could have a feature about upcoming features of the game.

In-Park Registration

The in-park spaces where VMK can be played include computers meant for registering a new character in VMK. These computers are equipped with a printer. When an avatar is on one of these computers, the VMK client prints a nicely designed slip to the user, which contains a picture of the users avatar and a special code, which the user can then use back at home for a reward.

Park Pass Codes

When visiting the Disney theme parks (and possibly through other means), people can get alphanumeric codes, which can be redeemed against something of value in the VMK. The code can be part of a park ticket, a Fast Pass, a special VMK print slip, a shop receipt etc. The something of value can be a combination of: VMK Credits, VMK Charms, Some VMK status indicator such as "Born in park" signifier. The code itself is a unique identifier of a transaction, which can contain the objects mentioned above. The information about the contents of the codes is owned and controlled by Disney.

When a user wants to redeem a code, the game engine contacts a Disney API and requests a list of actual contents of the code. The preferred standard for the integration is XML-RPC. The call to Disney will include the SWID of the user who is requesting the code and the code.

The reply from Disney can be 1. A list of objects and/or statuses that should be given to the user. 2. Message Indicating there was a non-fatal error in redeeming the code, such as for example the code has already been redeemed or that the user has exceeded a limit of how many codes can be redeemed. 3. Message indicating there was a fatal error in processing the redemption and that the user should try again later. There is a List of identifiers for the credits, charms and other statuses, which is used to compose the reply message.

Statistical information can be on a monthly basis detailing for instance player characteristics, number of unique characters (daily, weekly, monthly), from parks & which park, from outside parks, Geographical Location—Country, ZIP code, total number of characters, average length of time onsite, popularity of public spaces, most popular spaces, least popular spaces, popularity of multiplayer games, etc.

Billboards

The public spaces of VMK can contain a billboard, which can load a non-animated GIF file over http from a web server and display the contents of the image on the billboard. The images are prepared to match the size and shape of the billboard.

The back end tools of VMK allow the system administrators to change the URL from which each space loads the image, which is then displayed to all users who come to the space. The back end tools also allow for tracking of the performance of billboards, i.e. impressions and click thru rates.

Teaser Site can Include Different Features.

Avatar builder with a functional avatar builder The teaser site links to the Disney Global Registration process, which allows the users to create a Disney, account. After the account creation, the users are directed to the Avatar Builder which allows the user to create an avatar which is then linked to the Disney provided Global Registration SWID. The users are then are notified of the opening of the VMK and are able to use their registered accounts and the linked Avatars on the service. Characters created during this phase get special charms and clothing, depending in whether the avatar is created At Home or In Park.

Guests are able to enter pass codes for access to clothing items and inventory items to be used when the game launches. The guests see a list of items they get at the launch, based on the entered codes. The clothes represented by the redeem codes are available immediately Website The website include all Customer Service forms which are used to contact the customer service representatives of the Magic Kingdom:

Website Content
Home Page
What is VMK?
For kids
For parents
Screenshots/video clip(s)
What's New
Event schedule
User Support
Tutorial
Game Help
Tech Support
Merchandise Support/Code Help
Community
Newsletter type content created by Community Managers
Awards & Accolades
Shared Content Creation
Design Templates
3D templates
Bitmap templates
Further Exemplifications and Features of the Disclosure Virtual Magic Kingdom is a free multi-Player game, where you can have a Disney Theme Park experience and hang out with your friends. While it is designed to be enjoyed by Guests of all ages, many VMK Players are between the ages of 8-14, so VMK needs to be a safe, non-threatening environment.

This is a multi-Player game experience. Disney's Virtual Magic Kingdom, an entire magical virtual world in which Players from around the globe interact in exciting Theme Park environments, is currently available as a Sneak Preview to a limited number of Guests. Currently being tested for a full-scale launch this summer, this exciting new adventure by Disney brings the Theme Park experience into your home.

Disney's Virtual Magic Kingdom launches a great talent search. Talent scouts are checking out the Guest rooms of VMK in search of the most interesting and fun-filled Guest-styled rooms. Players demonstrating creative and stylish use of Guest rooms will be awarded special recognition within this new massive multi-Player game. Selected room creators get an exclusive pin, stacks of extra credits and a big kudos on the VMK Web site.

Players are offered magical spells to give them extra powers while playing VMK. Each spell gives you a unique chance to show off your ability while in the VMK world. There are four magic spells in effect in the Kingdom: Teleportation Magic, Dancing Inferno Magic, Invisibility Magic and Fireworks Magic. Acquire one and you may soon find yourself burning up the stage in the Street Party Music Game lobby or casually teleporting around the place. These magic spells are all available now in It's a Small World Imports, the Fantasyland® shop.

You're in Control. VMK Players can chat with one another. For your safety and comfort, a feature is in place to protect you from harassment by other Players. If another Player is saying or doing something that makes you uncomfortable, simply exit the area or room where the other Player is. If the other Player persists, just click the Character and select the ignore button and you won't see another word they type. If they're already in your list of friends, you can easily remove them, to stop receiving any messages from that Player.

All of the top Players earn pins to show off in their profile, as well as stacks of extra credits, and exclusive furnishings, magic effects and costumes.

Show Off Your Room. We've got talent scouts in the Kingdom looking for the coolest Guest rooms. Think you've got design flair? Then style your room and you may soon be spotted.

Become a Game Designer Some of the most popular Guest rooms in VMK are game rooms, where the owners give away their own VMK goodies to the Players who earn their races or quizzes. You can create your own games, using nothing more than furniture, the room description and your own wild imagination.

Pin Collectors Take Note You can win exclusive pins in the game by finding Disney Characters like The Yeti and Esmeralda the Fortune Teller, and snapping photos of Hidden Mickeys.

What Is a VMK Quest? A Quest is a challenge that takes place in a real Disney Theme Park. You must follow clues to discover secrets that will "Unleash the Magic" of VMK by giving secret codes to exclusive powers and prizes.

Print out a Quest at home and bring it with you on your next visit to Disneyland® park at Disneyland® Resort California or at the Magic Kingdom® Park at Walt Disney World® Resort Florida. Once you complete your in-park Quest, bring your completed form to VMK Central (it's marked on your Theme Park map) to get your secret codes and more. Some of the best and most rare rewards can ONLY be gotten this way.

VMK Central is also a place where you can pick up new and different Quests with special rewards attached to each one. In case you forget to bring a Quest from home, you can always get one here.

Explore Adventure land. Discover the mysteries of the Haunted Mansion. See Disney Theme Parks in a whole new way as you play these fun-filled games and add even more magic to your VMK experience Play VMK at a Disney Theme Park. VMK is more than an online experience. You cannot only play from home, you can also play while at a Disney Theme Park. Visit VMK Central while you are in Disneyland® Park at Disneyland® Resort in California or at the Magic Kingdom® Park at Walt Disney World® Resort in Florida to play VMK online or begin your VMK Quest.

Be a Born Winner! Get Main Street credit Any VMK Character created inside Disneyland® Park or the Magic Kingdom® Park will receive an exclusive "Born in Park" icon in its profile.

Get Cool Stuff! Take the challenge of in-Park Quests to earn sought-after, exclusive VMK accessories. Get stuff that can only be earned while you are a Guest at Disneyland® park or the Magic Kingdom® park. You'll be the envy of the Kingdom.

Pay Once. Play Twice. Purchase selected items at a Disney Theme Park and receive an exclusive virtual accessory for VMK Check Out the Latest. It's never the same magic twice. Every time you visit a Disney Theme Park there's something new to do. With never-ending new attractions, magical shows and exciting places to eat at Disneyland® Resort and Walt Disney World® Resort, it's hard to experience everything in one visit VMK Central. Get to the heartbeat of VMK when you visit Disneyland® park or the Magic Kingdom® Park at Walt Disney World® Resort. VMK Central is home to the VMK Quests and a source of information for you to discover all that VMK offers. Explore this whole new virtual world and play games with Players all over the globe. Extend your magical experience into the Theme Parks by challenging yourself with one of the VMK Quests. There is so much to do, come to VMK Central to have all your questions answered.

Save the Universe at Disneyland Park. Blast off to "infinity and beyond" as you join Buzz Lightyear* in Buzz Lightyear Astro Blasters, an interactive and intergalactic battle against the Evil Emperor Zurg. The fate of the universe is in your hands as you pilot your Star Cruiser through the treacherous terrain while zapping enemy targets and racking up points.

Whenever the game is open, there are VMK Staff on hand to help Players. VMK Staff are carefully selected and fully trained staff members. Players can ask VMK Staff for help at any time by clicking on HELP in the game. VMK Staff will then either send them a message or join them in the game to help hem. Conversations in all parts of VMK are logged and can be monitored at any time without warning. Questionable behavior may be reported to appropriate authorities. Conversation in the Kingdom is limited to a pre-defined dictionary of acceptable words and is monitored on a periodic basis. Only words that appear in the VMK dictionary are useable by Players. This only includes words considered suitable for the game. This filters out swearing, racist and sexist terms and other words unsuitable for children. It also filters out e-mail addresses, phone numbers and small town names. In addition to these measures, we also work hard to educate members about being safe in the game and online in general.

The drawings illustrate a rewards system having a central controller to coordinate and control activities and data transfer among the various links to theme park, awards distributors, on-site games, off-site games, rewards databases, and Internet servers.

The display may be implemented through a single display, or group of displays and coupled, directly or indirectly, to a common central controller such as through a local area network ("LAN") and/or through a wide area network ("WAN"). Alternatively, multiple central controllers may have access to a common rewards database. Single or group displays and housings would particularly be useful in a theme park In Park, or At Home, where a variety of customers are passing or spending money and may desire to play a game.

With the system as illustrated, multiple communication lines from the central controller may be coupled to the display controller of a game to relay and modify display data. The communication lines may include, without limitation, electronic or other data transferring cable (including optical as well as electrical), radio frequency wave transmissions including cellular frequency transmissions as well as microwave, satellite dish frequencies, etc., phone lines (again both optical and electrical) and the like, such as is common with remote communication systems.

Hardware or software included within the virtual theme park software and other game software may fix the function and displays on the computer. A player's rewards may be retrieved at the game location through the central controller from a rewards database associated with the central controller when a player accesses the virtual theme park software. As used herein, the term "remote" means and includes sites using communication lines to communicate one or more signals with a single site.

The virtual theme park software display and interaction may also be implemented through an Internet or Intranet server as an Internet or Intranet display to be viewed by at least one Internet browser. In this way, connection to a game and accumulation of rewards, may be accomplished with only a connection to the server through a conventional phone or other data transmission line, digital signal line ("DSL"), T-1 line, coaxial cable, fiber optic cable, or other connection known in the art. Enhanced bandwidth of digital wireless communications may render such technology suitable for some or all communications according to the present disclosure, particularly if such communications are encrypted. Higher data transmission speeds may be useful for enhancing the sophistication and response of the display and interaction with the player. Players may access an Internet virtual theme park site from any location where an Internet connection and computer, or other Internet facilitator for instance "WebTV" boxes, are available. Through computers and increased speed of Internet connections, there are increased opportunities for players to play and increase their rewards remotely, namely At Home as well as in the theme park, namely in In Park. Situations.

Once a player has selected and confirmed a reward for which the player would like to redeem rewards, the central controller then contacts a theme park controller to automatically provide the award selected by the player. From the player's unique identifier, which is associated with information related to the player or provided by the player, such as a password, PIN or other identifier for security purposes, a theme park may send the selected reward to the player. A player may redeem the rewards for an award directly from the theme park or Internet site, or by phone. By providing each theme park with access to a common reward database, reward totals may be immediately updated as rewards are redeemed or accumulated at any location. A rewards database, or another database associated with the central controller, may store not only a player's rewards profile or total in association with the player's unique identifier.

A system typically includes a microprocessor or other computer having a central processing unit ("CPU") and memory. The computer may be coupled to a number of peripheral devices such as, by example only, a display screen (e.g., a cathode ray tube ("CRT"), plasma display, liquid crystal display ("LCD"), and/or a display based on light emitting diodes ("LED")), possibly having a touchscreen input, and/or buttons, keys or other user input devices. In some situations this system can be a TV monitor, and the electronics associated with that monitor. Alternatively a special computer device can be provided to operate with a conventional TV, which can be an analog or digital TV unit.

Systems can also be coupled to one or more other computers such as a central computer of a theme park, e.g. via a network and link, modem and the like. The virtual theme park game parameters, such as how, when and where particular images will appear on the display screen, how the game works and how to operate the various elements are operably coupled to the computer, are stored in the memory.

The Internet also includes theme park or game host sites offering displays similar to those found in conventional systems. Generally, to play an Internet virtual theme park program or game, a software file is downloaded to a player's computer or terminal. This is used to install the necessary software for the virtual theme park experience and games and/or access the theme park or game host Internet site. Internet systems may be accessed using an identification code or name to identify a specific player. Thus, a player may access a system such as a theme park game through the Internet, Initiating a system can be done as simply as by inputting a user name and/or password.

The system may be used to access the Internet. Rather than using a personal computer as an Internet portal, a machine, or computer on a stand-alone basis or through a server, is configured for communication with the Internet. Such communication may comprise a continuous, secure link to a remote server is associated, or to an on-line theme park catalog of awards serving the display of the machine to provide examples of awards redeemable for rewards, to websites of the theme park operators or others The window or display segment of the display includes a rewards display to indicate the total rewards accumulated to date by the current player. As used herein, the term "rewards" contemplates a non-monetary tally having value, which may be exchanged for goods or services at the other of the In Park or At Home experience from which the reward is earned.

The system display shows information relating to theme park to encourage players to like and buy theme park merchandise or use theme park services. The information shown in the theme park activities display may comprise either still or moving images, pictures or words, or combinations thereof. The theme park activities display shows material, which may be rotated from theme park to theme park.

The rewards display can indicate the rewards required to exchange for the item or services shown. A player is encouraged to continue play so that the rewards will increase towards the higher value required for the displayed award or awards. From the display exhibiting the rewards, rewards may be redeemed by a player at that particular game for a desired displayed item once a reward has been reached.

Players may accumulate rewards through a variety of gaming and non-gaming activities. A significant concern and desire is for players to become familiar with the virtual theme park experience. Moreover, the theme park experiences may award rewards for non-gaming activities, both where money is spent, and where it is not. This can encourage customers to shop more at their stores or websites, theme park may award rewards for spending money in the sponsors' stores or websites, or using the sponsors' services or products. Additionally, theme park may award rewards for customers merely visiting locations where products are sold or used. This approach may also encourage customers to visit the other of the Virtual Theme park experiences even though the rewards are awarded simply based upon the customer's presence. For example, by awarding rewards for time spent in a them park land, a theme park awards rewards to all attendees at an event in the land.

Systems may be configured to award rewards for combinations of activities Such factors may include, the duration or frequency of theme park visitation; the amount of money or rewards exchanged; a pattern of player behavior such as patronizing certain businesses, Internet sites, or other locations. By awarding additional reward award combinations to those players who act in ways theme park desire, players are encouraged to patronize particular parks. Rewards may be awarded in greater quantities to those patronizing theme park within a selected group. For example, a group of theme parks may be identified, and those individuals patronizing at least some number of the theme parks within a given time period can receive a rewards "multiplier", such as 1.2, for all rewards earned during that period.

So long as a customer has a unique identifier, theme park are able to award rewards, and thus encourage customer behavior in real time, anywhere the theme park can access the rewards database, or alternatively, record the customer's number and activity. With respect to theme park encouraging behavior. When a player approaches a display and desires to play the game, it is necessary for the player to enter a unique identifier, so the game can access the player's reward total. There are many methods of indicating a player's unique identifier including bar codes, magnetic encoded data strips, "smart" cards with embedded microchips, personal identification numbers ("PIN"), "Bluetooth" technology electronic communicator, and any other form of identity verification including, magnetic, physical (i.e., thumb print, retinal scan, etc), digital, electronic or optical. The "Bluetooth" technology may be used to indicate the player's identification through as a small, short range, low-power, unlicensed, wireless transmitter or transceiver to a corresponding receiver or transceiver within a game. Through this, a player need only approach a game and the game will automatically register the player's identity and rewards total. Bar codes, magnetic encoded data strips and "smart" cards would require additional game attachments to read the player's identification from identification cards presented by the player. PIN entry may be accomplished within a portion of a window for a touchscreen, or through an external PIN entry device such as a keyboard, keypad or cursor manipulating device such as a touch pad, roller ball or mouse.

Because an system display may be displayed through an Internet server, players may play theme park games using their rewards from home, work, or even other locations, as facilitated by the increased availability and bandwidth of digital and cellular phones and other wireless technology.

A player of a non-gaming system may use rewards as credits for the game. In this way, theme park management chooses to award rewards for a variety of activities, such as visiting sponsors' Internet sites or stores. The rewards accumulated by a player may then be used for entertainment rather than for redeeming toward specific award items.

As used herein, the term "Internet" is one form of network and is distinguished from a dedicated or proprietary network such as a LAN network or WAN, network. The disclosure would operate with networks generally. The term network includes by way of example a form of communications system and includes plurality of mutually remote sites having the capability of communicating digital information, at least in part, through communication channels owned or controlled by third parties and being directed and, where necessary, relayed by servers or other suitable apparatus. Such communication channels may include, without limitation, electronic or other data transferring cable (including optical as well as electrical), radio frequency wave transmissions including cellular frequency transmissions as well as microwave, satellite dish frequencies, etc., phone lines (both optical and electrical) and the like, such as is common with remote communication systems.

As used herein, the term "system" means and includes not only completely systems including a display driven responsive to a signal. The term "system" also means and includes portable games, which may be physically connected to a host system by a permanent or removable connection, or which may be connected or in communication therewith using wireless technology. Further, the term specifically includes, without limitation, conventional, existing electronic or electromechanical machines to which may be added an electronic display. Other embodiments involving different forms of displays, communications methods and multiple circuit boards may also be used. The term "system" also means and includes an apparatus according to the present disclosure, which includes features other than electronic ones.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A system of interaction between an electronic theme park experience and a live theme park experience comprising:
    an interaction permitting for rewards earned in the live theme park experience, wherein the rewards are to be redeemed in the electronic theme park experience;
    a network accessible to couple the electronic theme park and live theme park in real or delayed time through the network; and
    activities and/or rewards on the electronic theme park being designed to drive increased player visiting of the live theme park, wherein activities and/or rewards are selected based on the redeemed rewards earned in the live theme park experience and wherein the electronic theme park experience is altered by the activities and rewards.

2. A system as claimed in claim 1 wherein the electronic theme park experience is implemented by an interactive game, the interactive game operable on a computer and viewable on a display in the live theme park experience and in the electronic theme park experience and wherein the activities and/or rewards alter operation of the interactive game.

3. The system of claim 1, including in the electronic theme park experience a display of rewards obtainable at the live theme park experience.

4. The system of claim 2, including an awards display window in the interactive game configured to display a plurality of the activities and awards for which a player may redeem the rewards earned in the live theme park experience.

5. The system of claim 1 configured to increase the rewards in response to an aspect of a player's activity in at least one of the theme park formats.

6. The system of claim 1 wherein there is provided a chat room for players to communicate with other players on-line with the electronic theme park.

7. The system of claim 2 wherein a player in the interactive game selectively adopts a unique identity, wherein ones of the unique identities generated in the live theme park experience comprise avatars with at least one characteristic available via the live theme park experience.

8. The system of claim 1 wherein the electronic theme park environment permits individual players to design and modify selected areas in the electronic theme park adopted by them.

9. The system of claim 2 wherein players of the interactive game in the electronic theme park experience have the ability to invite other players playing selectively in at least one of the live theme park experience or in the electronic theme park experience to enter a selected area of the interactive game associated with the players.

10. The system of claim 1 wherein the electronic theme park environment includes a navigator, the navigator permitting players electronically to move between selected areas in the electronic theme park, the selected areas being selectively at least one of a private area of a player or a public area defined in the electronic theme park.

11. The system of claim 1 wherein the network includes an internet network.

12. A system of interaction between an electronic theme park experience and a live theme park experience comprising:
a remote terminal;
a central controller in communication with the remote terminal, wherein the communication is through a network connection;
a system configured to retrieve and display rewards of a player accessing the remote terminal; and
a rewards database accessible by the central controller and from which the rewards of the player are retrieved, wherein the rewards comprise at least one reward available through participation in the live theme park experience.

13. A method of interaction between an electronic theme park experience and a live theme park experience comprising:
assigning a unique identifier to a person;
awarding rewards to the uniquely identified person for predetermined activities involving transactions at the live theme park experience, wherein the rewards are unavailable to another person only accessing the electronic theme park experience; and
permitting redemption of the rewards to the uniquely identified person for predetermined activities and/or character functionality in an interactive game in the electronic theme park experience.

14. The system of claim 1, wherein the rewards earned in the live theme park experience comprise a code and wherein the code is used by the electronic theme park experience to select a particular one of the activities and rewards.

15. The system of claim 14, wherein the code is presented to a person that performs an activity in the live theme park experience.

16. The system of claim 7, wherein the at least one characteristic comprises a special ability provided to the avatars in the interactive game.

17. The system of claim 2, wherein the interaction further comprises permitting for rewards earned during play of the interactive game in the electronic theme park experience to be redeemed in the live theme park experience for one or more benefits displayed in the interactive game in the electronic theme park experience.

18. The system of claim 2, wherein the activities and rewards selected based on the redeemed rewards earned in the live theme park experience comprise a charm provided to players of the interactive game in the live theme park experience.

19. The system of claim 2, wherein at least one of character functionality and game level access is granted selectively to players who access the interactive game in the live theme park experience.

20. The system of claim 12, further comprising running an interactive game on the remote terminal in the electronic theme park experience, wherein the interactive game is at least partially configured based on the at least one reward retrieved from the rewards database.

21. The system of claim 20, wherein the interactive game is configured to provide the player with access to a level that is inaccessible without the at least one reward.

22. The system of claim 20, wherein the interactive game comprises an avatar associated with the player, the avatar being configured at least in part based on the at least one reward obtained through participation in the live theme park experience.

23. The system of claim 20, wherein the remote terminal is operable to receive a code from the player and to modify operation of the interactive game based on the code, the code being provided to the player based on participation in an activity in the live theme park experience.

* * * * *